United States Patent
Simpson et al.

(10) Patent No.: US 10,100,729 B2
(45) Date of Patent: Oct. 16, 2018

(54) COOLING DEVICE FOR ELECTRO-PNEUMATIC CONTROLLER

(71) Applicant: Hamilton Sundstrand Corporation, Windsor Locks, CT (US)

(72) Inventors: Scott W. Simpson, Easthampton, MA (US); Richard R. Phillips, West Hartford, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 829 days.

(21) Appl. No.: 14/599,802

(22) Filed: Jan. 19, 2015

(65) Prior Publication Data

US 2016/0208694 A1 Jul. 21, 2016

(51) Int. Cl.
| | |
|---|---|
| *F02C 6/08* | (2006.01) |
| *F16K 49/00* | (2006.01) |
| *F16K 31/163* | (2006.01) |
| *F02K 3/115* | (2006.01) |
| *F04B 53/08* | (2006.01) |
| *F04B 53/10* | (2006.01) |

(52) U.S. Cl.
CPC ............... *F02C 6/08* (2013.01); *F02K 3/115* (2013.01); *F04B 53/08* (2013.01); *F04B 53/10* (2013.01); *F16K 31/1635* (2013.01); *F16K 49/005* (2013.01); *F05D 2260/20* (2013.01); *Y02T 50/671* (2013.01); *Y02T 50/675* (2013.01)

(58) Field of Classification Search
CPC ...... F16K 49/00; F16K 49/005; F16K 49/007; F01L 3/12–3/18
See application file for complete search history.

(56) References Cited

U.S. PATENT DOCUMENTS

| | | | |
|---|---|---|---|
| 3,216,660 A | 11/1965 | Mott | |
| 3,882,833 A * | 5/1975 | Longstaff | F01L 9/04 123/90.11 |
| 4,421,067 A | 12/1983 | Krowech | |
| 5,101,848 A * | 4/1992 | Kojima | F16K 13/10 137/13 |
| 6,318,312 B1 * | 11/2001 | Bauer | F01L 9/04 123/90.11 |
| 2004/0149944 A1* | 8/2004 | Hopper | F01L 9/04 251/54 |
| 2009/0261279 A1* | 10/2009 | Tanner | F16K 1/221 251/62 |

(Continued)

FOREIGN PATENT DOCUMENTS

| | | |
|---|---|---|
| EP | 2476882 A2 | 7/2012 |
| JP | 01167431 A * | 7/1989 |

OTHER PUBLICATIONS

Extended European Search Report for EP Application No. 16151764.4, dated Jun. 10, 2016, 7 pages.

*Primary Examiner* — Laert Dounis
(74) *Attorney, Agent, or Firm* — Kinney & Lange, P.A.

(57) ABSTRACT

A valve system includes a valve, a valve controller, and a heat exchanger. The valve is configured to open and close a control device in response to a working fluid. The controller controls the flow of the working fluid to and from the valve. The heat exchanger is mounted between the valve and the valve controller. The heat exchanger receives the working fluid from the valve, cools the working fluid using a cooling stream, and delivers cooled working fluid to the valve controller.

12 Claims, 7 Drawing Sheets

(56) References Cited

U.S. PATENT DOCUMENTS

| | | | |
|---|---|---|---|
| 2011/0023447 A1* | 2/2011 | Veilleux | F01D 25/12 |
| | | | 60/39.83 |
| 2012/0199211 A1* | 8/2012 | Schroder | F01D 17/24 |
| | | | 137/14 |
| 2012/0216545 A1 | 8/2012 | Sennoun | |
| 2013/0042612 A1* | 2/2013 | Shapiro | F03G 7/05 |
| | | | 60/641.7 |
| 2013/0199615 A1 | 8/2013 | McHugh | |
| 2015/0082767 A1* | 3/2015 | Erickson | F01D 25/12 |
| | | | 60/39.83 |
| 2015/0219236 A1* | 8/2015 | Seon | F16K 1/30 |
| | | | 165/297 |
| 2016/0208702 A1* | 7/2016 | Schroder | F02C 6/08 |

* cited by examiner

COOLING DEVICE FOR ELECTRO-PNEUMATIC CONTROLLER

BACKGROUND

Pneumatic valves are one of many components of a system that controls the flow of a fluid through a system. Pneumatic valves are control devices powered by pressurized fluid, normally air. In many circumstances, pneumatic pressure is supplied to the driving, or actuating, portion of the valve from a pressure source. The driving portion of the valve transforms pneumatic pressure into mechanical power for operating or actuating a control mechanism in a supply line, duct, or pipe. The control mechanism may be an isolation valve having only two positions, open and closed, where the open position allows flow to pass and the closed position stops flow. The control mechanism may also be a control valve that is capable of modulating flow of the fluid it is controlling. For example, the control valve may allow fluid to pass in increments of one percent from zero percent to one hundred percent, or any desired command increment.

To control the supply of fluid into the driving portion of a pneumatic valve, a controlling device is often used. The controlling device regulates flow of the fluid into the driving portion of the pneumatic actuator using nozzles or control orifices that are regulated. One example of a controlling device is a torque motor, which uses an electromagnetic motor to control the opening and closing of nozzles to selectively provide air to the driving portion of a pneumatic actuator.

SUMMARY

A valve system includes a valve, a valve controller, and a heat exchanger. The valve is configured to open and close a control device in response to a working fluid. The controller controls the flow of the working fluid to and from the valve. The heat exchanger is mounted between the valve and the valve controller. The heat exchanger receives the working fluid from the valve, cools the working fluid using a cooling stream, and delivers cooled working fluid to the valve controller.

Another embodiment includes a method. The method includes receiving a working fluid in a first passage of a heat exchanger that is mounted between a valve and a valve controller. The heat exchanger directs the working fluid through a first conductive path. A cooling fluid is received in a second passage of the heat exchanger and directed through a second conductive path. The working fluid is cooled through indirect heat transfer using the cooling fluid and is delivered to the valve controller from the heat exchanger. The cooling fluid is exhausted from the heat exchanger. The working fluid is delivered from the valve controller to a bypass path of the heat exchanger, and is supplied from the heat exchanger to a chamber of the valve.

DETAILED DESCRIPTION

Figure 1:
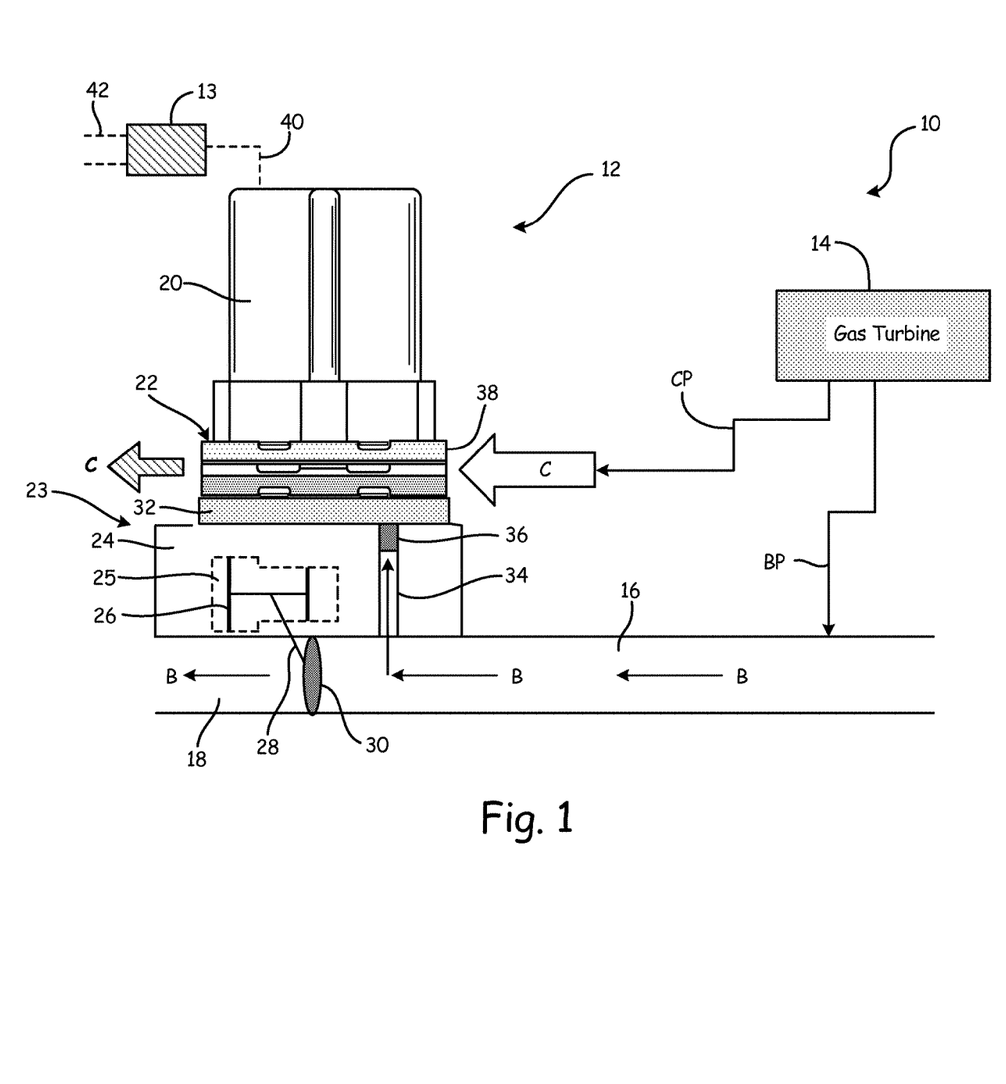
FIG. 1 is a schematic view of a portion of an aircraft environmental control system.

FIG. 1 is a schematic view of aircraft environmental control system 10, which includes valve system 12, controller 13, gas turbine engine 14, upstream duct 16, and downstream duct 18. Valve system 12 includes valve controller 20, heat exchanger 22, and valve 23 (valve 23 includes actuator 24, piston chamber 25, piston 26, and linkage 28), disc 30, mounting surface 32, bleed path 34, and bleed inlet 36. Also included in aircraft environmental control system 10 are cooling inlet 38, valve controller input 40, and device inputs 42. Also illustrated are bleed path BP, cooling path CP, bleed stream B, and cooling stream C.

Gas turbine engine 14 connects to upstream duct 16 through bleed path BP, which may include ducts, pipes, or other conduits (not shown). Upstream duct 16 connects to valve system 12. Also connected to valve system 12 is downstream duct 18. Disc 30, though described as a disc similar to that found in a butterfly valve, can also be a ball, gate, or any other flow modulating device.

Within valve system 12, valve controller 20 connects to heat exchanger 22. Heat exchanger 22 also connects to mounting surface 32, which is part of actuator 24, either as a part of an assembly or as an integral part of actuator 24. Piston 26 resides within piston chamber 25, which resides within actuator 24. Piston 26 is physically connected to linkage 28, which connects to disc 30. Disc 30 is situated adjacent to upstream duct 16 and downstream duct 18. Bleed path 34 is a physical path traveling through actuator 24 to bleed inlet 36, which also connects to heat exchanger 22. Bleed path 34 also connects to part of piston chamber 25. Gas turbine 14 directs cooling air, such as fan or ram air, to cooling inlet 38 through cooling path CP through ducts, pipes, or other conduits (not shown).

Controller 13 is electrically connected to valve controller 20 through valve controller input 40. Also electrically connected to controller 13 are device inputs 42. Device inputs 42 can be connected to measurement devices within gas turbine engine 14.

According to one embodiment of aircraft environmental control system 10, gas turbine engine 14 provides bleed stream B via bleed path BP from a component within gas turbine engine 14, such as a compressor. Bleed stream B is routed from gas turbine engine 14 and into upstream duct 16 where it travels through upstream duct 16 and encounters two possible flow paths. In the first path, bleed stream B may travel to disc 30, of valve system 12, where bleed stream B may be regulated. For example, disc 30 may be in an open position allowing bleed stream B to flow past disc 30 and on to downstream duct 18, where bleed stream B can continue to the remainder of aircraft environmental control system 10. Thereafter, processes may be performed on or by bleed stream B, such as heating or cooling. If disc 30 is in a closed position, bleed stream B can be stopped at disc 30, preventing bleed stream B from flowing into downstream duct 18. Upstream duct 16 and downstream duct 18 can be ducts, pipes, tubes, ports or any other passageways capable of supporting pressurized flow. These passageways may be made of metal, plastic, or any other material suited for allowing the flow of pressurized fluid.

Bleed stream B also travels from upstream duct 16 into actuator 24 through bleed path 34. While in actuator 24, bleed stream B may be used by actuator 24 for pneumatic pressure and may also be routed to bleed inlet 36 of heat exchanger 22, where bleed stream B travels through heat exchanger 22 before entering valve controller 20.

Gas turbine engine 14 provides cooling stream C to cooling path CP through a component within gas turbine engine 14, such as a fan. Cooling stream C may also be supplied from ram air collected by the aircraft. Cooling stream C is routed through gas turbine engine 14, through cooling path CP, and through heat exchanger cooling inlet 38 where it travels through heat exchanger 22, ultimately exiting heat exchanger 22.

Heat exchanger 22 accepts bleed stream B into working paths, and cooling stream C into cooling paths. The cooling paths are physically separated from the working paths by plates. The plates of heat exchanger 22 are composed of a thermally conductive material capable of transferring heat between the paths on either side of each plate. For example one plate may transfer heat from bleed stream B into cooling stream C. This lowers the temperature of bleed stream B before it enters valve controller 20.

After entering valve controller 20, bleed stream B may be returned to piston chamber 25 within actuator 24 to pneumatically power piston 26. Piston 26 transforms the pneumatic pressure of bleed stream B into linear motion. The linear motion of piston 26 is transferred to disc 30 by linkage 28. Linkage 28 also translates the linear motion into rotational motion of disc 30. The rotational motion of disc 30 functions to open the passageway for bleed stream B to flow from upstream duct 16 to downstream duct 18, or close this passageway.

Valve controller 20 receives control signals from controller 13 through valve controller input 40. These signals instruct valve controller 20 how to control the flow of bleed stream B through valve controller 20, which in turn actuates actuator 24, as described above. Controller 13 makes determinations on how to control valve controller 20 based on calculations performed within controller 13. These calculations are performed based on inputs received through device inputs 42. Device inputs 42 can be connected to measurement devices within gas turbine engine 14, aircraft environmental control system 10, another controller within these systems, or any other signal source within an aircraft. The measurement devices with these systems provide measurement data, such as pressure, temperature, or flow rate, to be considered by controller 13.

Valve controller 20 can be an electromagnetic pneumatic device, such as a torque motor, using electricity to operate nozzles within valve controller 20 to control the flow of bleed stream B, pressurized air, into and out of valve controller 20. In operation, valve controller 20 may receive a constant or frequent flow of bleed stream B, which may have a temperature of up to (or over) 1000 degrees Fahrenheit (538C). This hot air heats up valve controller 20 and its internal components and wiring. Some components within valve controller 20, such as the electrical components, are susceptible to failure at these temperatures, or due to thermal cycling between these operating temperatures and much lower non-operating temperatures.

A solution in the prior art is to apply expensive coatings to prevent component failure due to thermal stress and strain and thermal cycling. Another solution common in the prior art is mounting of valve controllers remotely from the actuator to avoid thermal conduction from the actuator to the valve controller, and to provide the valve controller with a lower ambient temperature environment to keep the valve controller cool. Remote mounting of the valve controller is another common solution for dealing with heat in the prior art, but comes at the expense of routing lines from the actuator to the valve controller. Remote lines add cost and weight, and create lag in operation of the valve system caused by delays in the valve controller sending and receiving fluid over a distance.

This disclosure addresses these issues by adding heat exchanger 22 between valve controller 20 and actuator 24 of valve 23. Heat exchanger 22 cools bleed stream B before it enters valve controller 20 by using cooling stream C as a cooling medium, as described above. This heat transfer process can lower the temperature of bleed stream B several hundred degrees Fahrenheit before bleed stream B enters valve controller 20. Further, heat exchanger 22 acts as a thermal insulator, reducing the amount of heat that valve controller 20 conducts from mounting surface 32 of actuator 24. With heat exchanger 22 between valve controller 20, less heat conducts from mounting surface 32 to valve controller 20. The combination of these functions drastically decreases the operating temperature of valve controller 20, providing several benefits: valve controller 20 can be directly mounted to actuator 24; component life of valve controller 20 is increased; and cost reductions of valve controller 20 (such as removal of thermal coatings) can be implemented.

Figure 2:
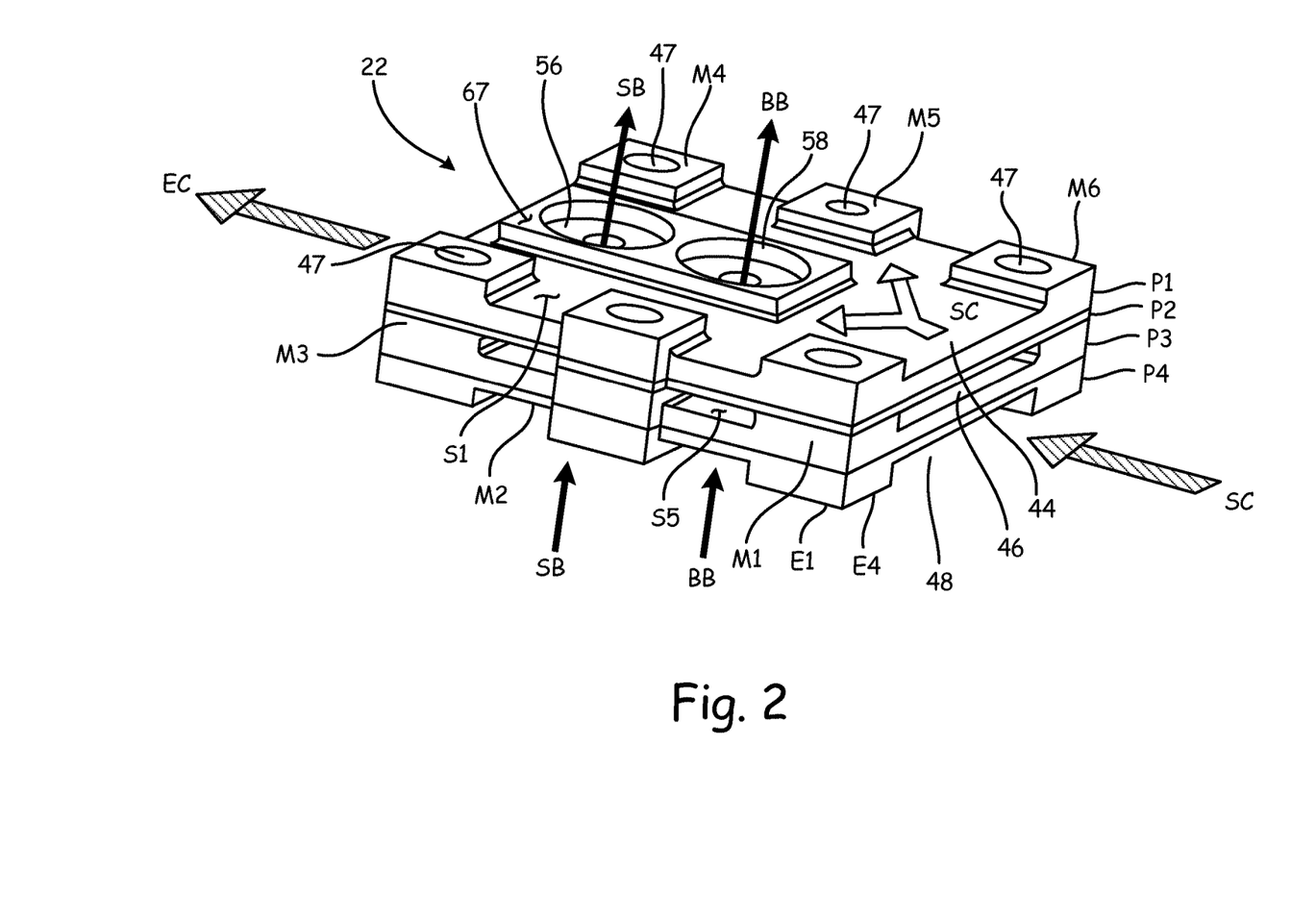
FIG. 2 is an isometric view of the heat exchanger of FIG. 1.
Figure 3A:
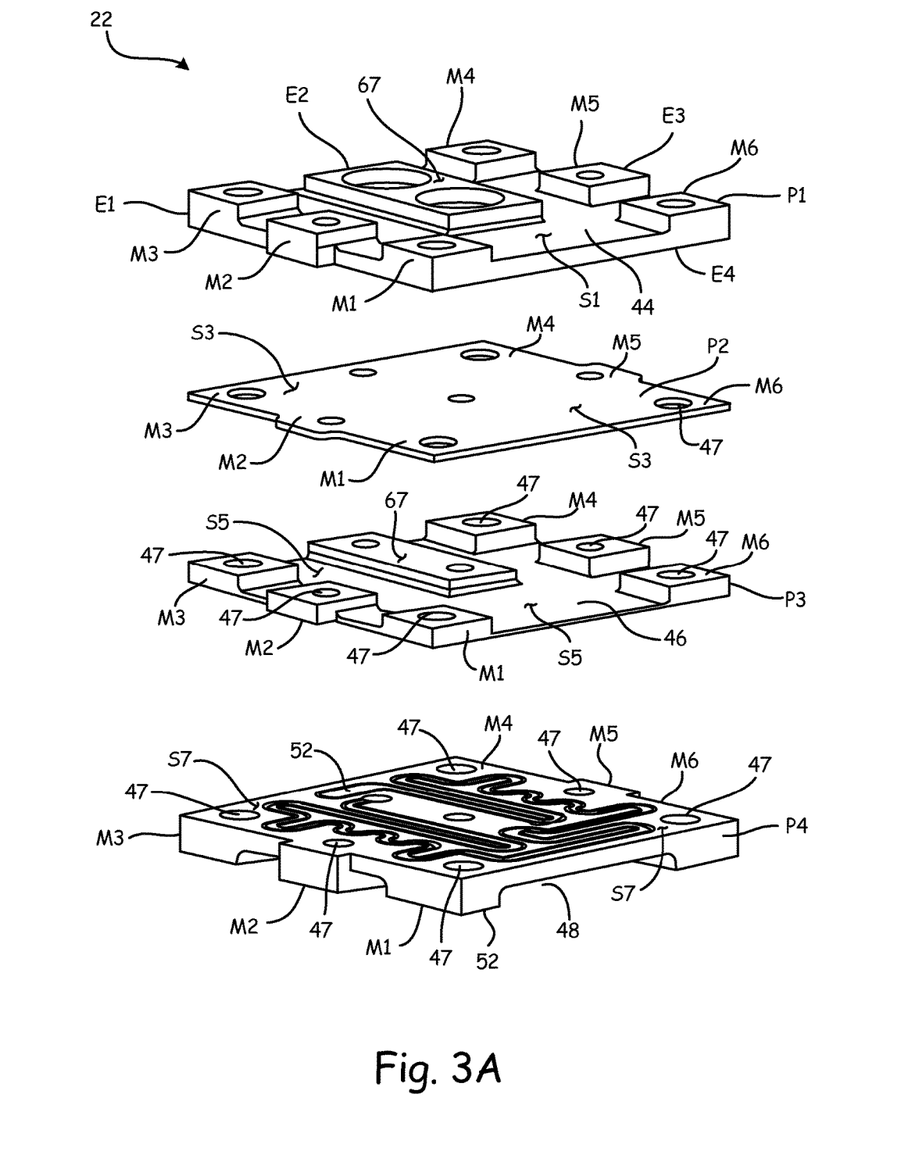
FIGS. 3A and 3B are exploded isometric views of a multiple plates embodiment of the heat exchanger of FIG. 1.
Figure 3B:
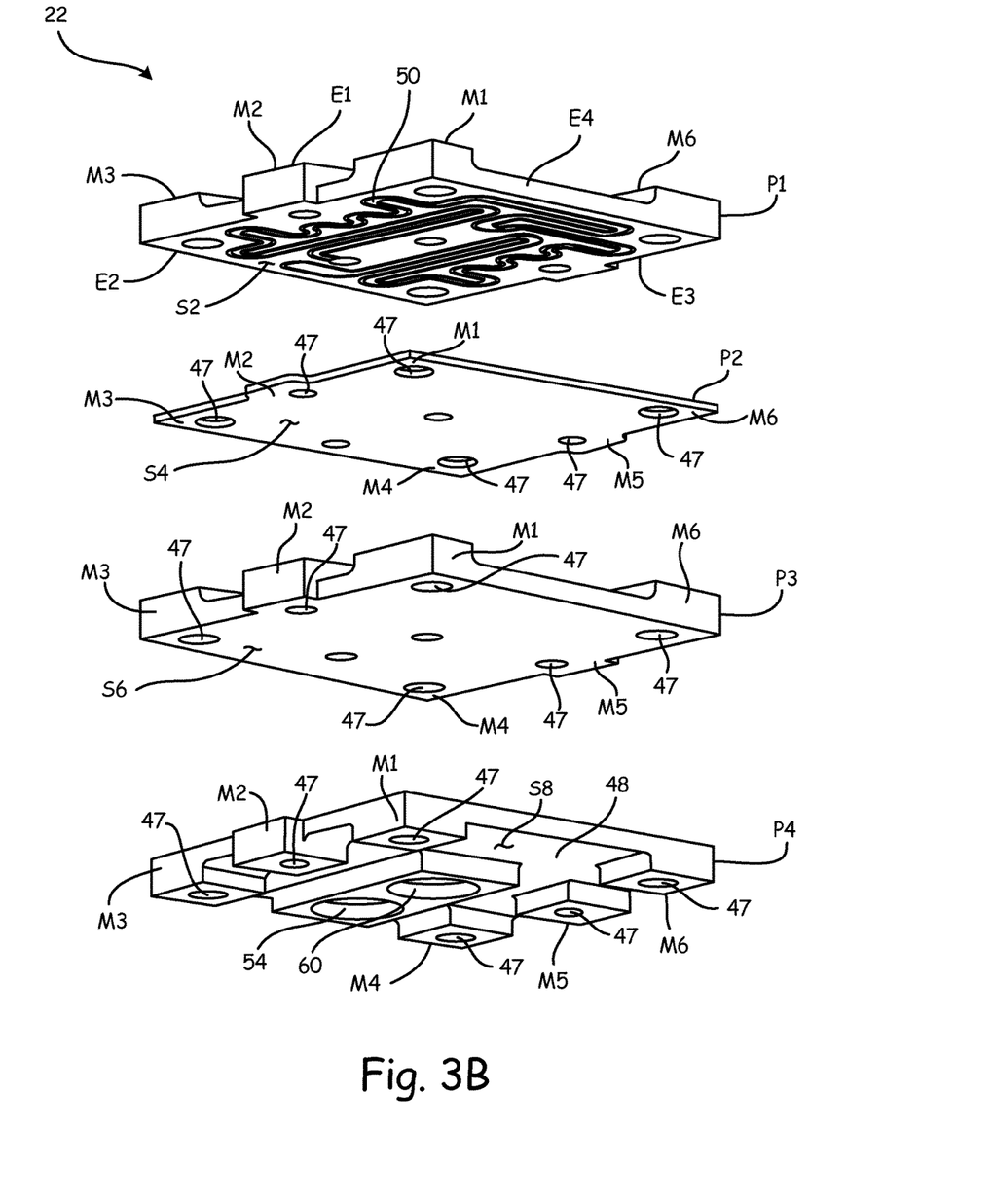

FIG. 2 is an assembled isometric view of heat exchanger 22. FIG. 3A is an exploded isometric view from above heat exchanger 22 in which top surfaces S1, S3, S5, and S7 of plates P1-P4, respectively, can be seen. FIG. 3B is an exploded isometric view from below heat exchanger 22 in which bottom surfaces S2, S4, S6, and S8 of plates P1-P4, respectively, can be seen. FIGS. 2, 3A, and 3B are discussed concurrently.

Heat exchanger 22 includes plates P1-P4. Plates P1-P4 include mounts M1-M6 (which include holes 47) and ends E1-E4. Plate P1 includes surfaces S1 and S2, cooling channel 44, bleed channel 50, supply bleed stream outlet 56, bypass bleed stream inlet 58, and raised surface 67. Plate P2 includes surfaces S3 and S4. Plate P3 includes surfaces S5 and S6, cooling channel 46, and raised surface 69. Plate P4 includes surfaces S7 and S8, cooling channel 48, bleed channel 52, supply bleed stream inlet 54, and bypass bleed stream outlet 60. Also shown in FIG. 2 are supply cooling stream SC, exhaust cooling stream EC, bypass bleed stream BB, and supply bleed stream SB.

Plate P1 mates to plate P2, which mates to plate P3, which mates to plate P4. Plate P1 also mounts to valve controller 20 (of FIG. 1), mating to valve controller 20 at mounts M1-M6 of plate P1, which are surfaces extending away from surface S1, towards the surface of valve controller 20. The surface of valve controller 20 acts as a seal for cooling channel 44. Surface S2 of plate P1 has no extended mounting surface. However, holes 47 of mounts M1-M6 of plate P1 do extend through plate P1 from surface S1 to surface S2. Holes 47 of M1-M6 align with holes 47 of mounts M1-M6 of plates P2-P4. Holes 47 pass through mounts M1-M6.

Plate P2 has mounts M1-M6, but they do not extend from surface S3 or surface S4—surfaces S3 and S4 are flat. However, mounts M1-M6 of plate P2 have holes 47, as described above. Surface S3 of plate P2 mounts to surface S2 of plate P1. Plate P2 acts as a seal for bleed channel 50, which travels through plate P1. Surface S4 of plate P2 is also flat, and mounts to surface S5 of plate P3 acting as a seal for cooling channel 46.

Similar to surface S1, surface S5 of plate P3 has mounts M1-M6 which extend away from surface S5 towards plate P2, partially creating cooling channel 46. However, the underside of plate P3, surface S6, is flat. Surface S6 mounts to surface S7 of plate P4 acting as a seal for bleed channel 52 of plate P4.

Also similar to surface S1, surface S8 of plate P4 has mounts M1-M6 which extend away from surface S8 towards mounting surface 32 (of FIG. 1), partially creating cooling channel 48. Cooling channel 48 is sealed by mounting surface 32.

Plates P1-P4 are rectangular cuboids, having protuberances on multiple surfaces. Plates P1-P4 can be composed of a thermally conductive material, such as steel, steel alloys, or nickel-based superalloys, such as inconel.

Bleed channels 50 and 52 are for routing bleed stream B through heat exchanger 22. Bleed channels 50 and 52 are physically separated from each other by plates P2 and P3. Supply bleed stream inlet 54 connects to bleed channel 52. Bleed channel 52 is routed through plate P4 and is connected by plates P2 and P3 to bleed channel 50 of plate P1. Bleed channel 50 connects to supply bleed stream outlet 56, which connects to valve controller 20. Also connected to valve controller 20 is bleed stream bypass inlet 58. Bleed stream bypass inlet 58 also connects to bleed stream bypass outlet 60 through plates P2 and P3. Bleed stream outlet 60 is connected to chamber 25 of valve 23 (of FIG. 1).

On top of bleed channel 50 is cooling channel 44 at surface S1, which is sealed by valve controller 20 (of FIG. 1). Cooling channel 46 is between bleed channels 50 and 52, and cooling channel 48 is on the bottom of bleed channel 52, which is sealed by mounting surface 32 (of FIG. 1). Raised surface 67 of plate P1 surrounds supply bleed stream outlet 56 and bypass bleed stream inlet 58, extending away from surface S1, towards valve controller 20. Similarly, raised surface 69 of plate P3 surrounds bleed ports (discussed in later figures), extending away from surface S5, towards surface S4 of plate P2.

In one embodiment, the assembly of plates P1-P4 mount together to form a single heat exchanger, heat exchanger 22, which is mounted to valve controller 20 at side S1 and is mounted to mounting surface 32 of actuator 24 at side S8. Fasteners (not shown) pass through holes 47 of mounts M1-M6 of each plate securing heat exchanger 22 to both valve controller 20 and actuator 24. Other fastening methods may be used in other embodiments. Heat exchanger 22 may be assembled from multiple pieces and welded, oven-brazed, or fastened together to create a single assembly. Heat exchanger 22 can be composed of any material capable of transferring heat and suitable for its application, such as steel, steel alloys, or nickel-based superalloys, such as inconel.

This assembly creates cooling channels 44, 46, and 48 and creates bleed channels 50 and 52 (as described above). Cooling channels 44, 46, and 48 receive and discharge cooling stream C (as described in FIG. 1). Bleed channels receive bleed stream B, which is routed through plates P1 and P4 before being discharged into valve controller 20.

More specifically, in one embodiment of heat exchanger 22, supply cooling stream SC enters cooling channels 44, 46, and 48 at end E4. Supply cooling stream SC may exit cooling channels 44, 46, and 48 through the gaps between mounts M1-M6 or between mounts M1-M6 and raised surface 67. In some embodiments, exhaust cooling stream EC may exit cooling channel 46 at only one end, such as E2, depending on desired cooling performance and routing of ducting or piping that delivers and receives cooling stream SC to and from heat exchanger 22.

Supply bleed stream SB enters bleed channel 52 at supply bleed stream inlet 54, is routed through bleed channel 52, and travels to bleed channel 50. Supply bleed stream SB then exits heat exchanger 22 at supply bleed stream outlet 56 and travels into valve controller 20 (of FIG. 1). Bypass bleed stream BB exits valve controller 20 and enters bypass bleed stream inlet 58, passes through heat exchanger 22 in a short bypass path through plates P1-P4, travels to bypass bleed stream outlet 60, and exits into actuator 24. Bypass bleed stream BB may also travel the other direction, from actuator 24, through heat exchanger 22 and into bleed controller 20.

As supply cooling stream SC passes through cooling channels 44, 46, and 48, it contacts the surfaces bleed channels 50 and 52, allowing for heat transfer to occur between bleed channels 50 and 52 and supply cooling stream SC. Bleed channels 50 and 52 are also in contact with bleed stream B, which flows within bleed channels 50 and 52. Therefore, supply bleed stream SB and supply cooling stream SC are in an indirect heat exchange relationship through cooling channels 44, 46, and 48, bleed channels 50 and 52, and plates P1-P4. Bleed channels 50 and 52 will indirectly transfer heat (most often) from supply bleed stream SB to supply cooling stream SC, lowering the temperature of supply bleed stream SB, and raising the temperature of supply cooling stream SC. Because the bypass bleed stream travels through a (relatively) short path through heat exchanger 22, bypass bleed stream takes part in little heat transfer before exiting heat exchanger 22 and entering actuator 24.

Figure 4A:
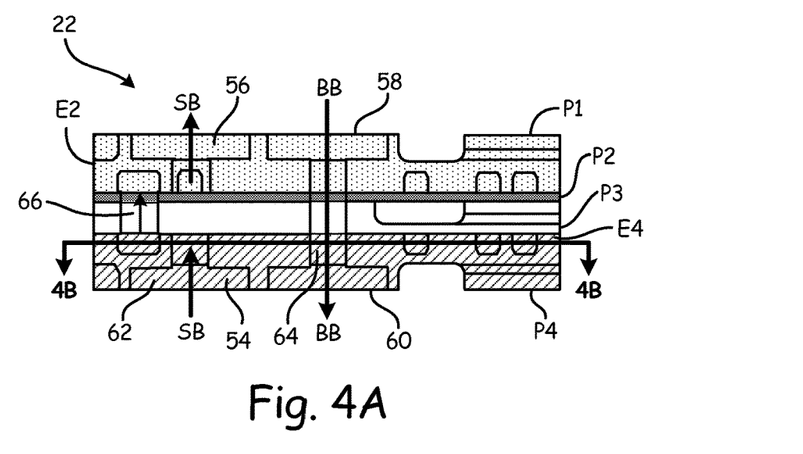
FIG. 4A is a cross-sectional elevation view of the heat exchanger of FIG. 1 along section 4A-4A of FIG. 4B.
Figure 4B:
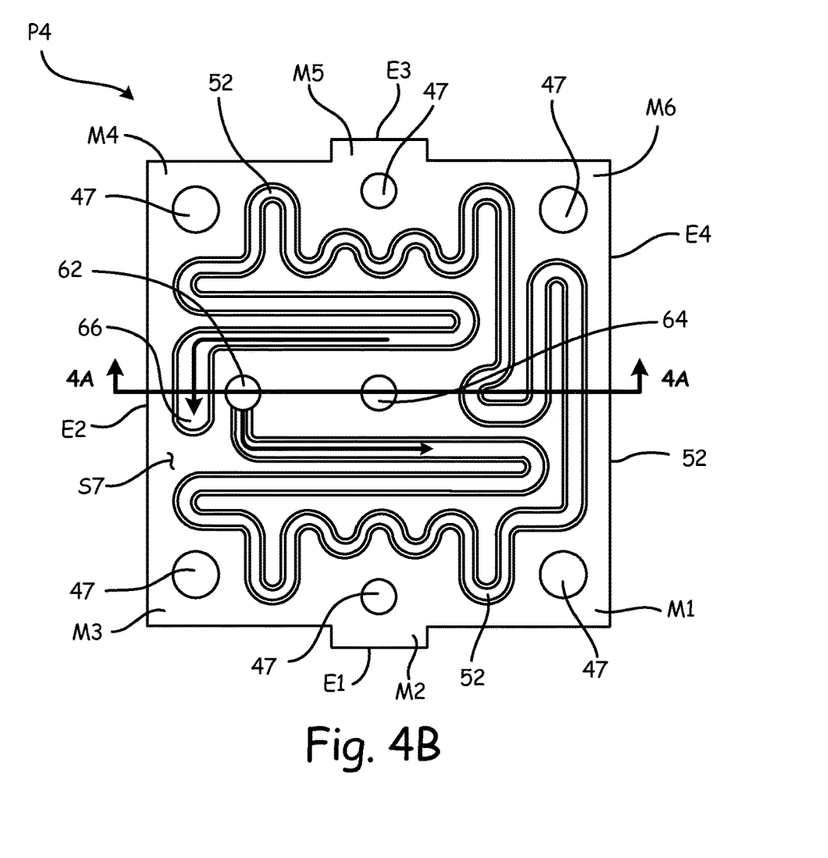
FIG. 4B is a view of the heat exchanger of FIG. 1 along section 4B-4B of FIG. 4A.

FIG. 4A is a cross-sectional elevation view of heat exchanger 22 along section 4A-4A of FIG. 4B. FIG. 4B is a plan view of section 4B-4B of heat exchanger 22. FIG. 4A includes plates P1-P4, supply bleed stream inlet 54, supply bleed stream outlet 56, bypass bleed stream inlet 58, bypass bleed stream outlet 60, supply bleed port 62, bypass bleed port 64, and bleed channel connector 66. Also shown in FIG. 4A are sides E2 and E4, supply bleed stream SB, and bypass bleed stream BB.

FIG. 4B includes plate P4, mounts M1-M6, bleed channel 52, supply bleed port 62, bypass bleed port 64, and bleed channel connector 66. Also displayed are ends E1-E4, surface S7 and supply bleed stream SB.

The connection and functionality of FIGS. 4A and 4B are discussed concurrently. Plates P1-P4 are mounted to each other as explained in FIGS. 2, 3A, and 3B creating cooling channels and bleed channels (shown in FIGS. 3A, 3B). Supply bleed inlet 54, of plate P4, connects to bleed inlet 36 (of FIG. 1). Supply bleed inlet 54 further connects to supply bleed port 62, also of plate P4, which connects to bleed channel 52. Bleed channel 52 travels through plate P4, changes directions multiple times, and finally arriving at bleed channel connector 66, where it travels through plates P3 and P2 before entering bleed channel 52 of plate P1.

Supply bleed stream outlet 56, of plate P1, connects to an inlet of valve controller 20. Connected to an outlet of valve controller 20 is bypass bleed stream inlet 58, which connects to bypass bleed port 64, of plate P1. Bypass bleed port 64 passes through plates P1-P4 before connecting to bypass bleed stream outlet 60 of plate P4, where bypass bleed port 64 connects to an inlet of actuator 24.

In one embodiment, plates P1-P4 create two passages for supply bleed stream SB. Supply bleed stream SB can flow into supply bleed inlet 54 to supply bleed inlet port 62 and into bleed channel 52, where supply bleed stream weaves through bleed channel 52 within plate P4 (and contained by plate P3). Thereafter, supply bleed stream SB exits bleed channel 52 into bleed channel connector 66, where supply bleed stream SB can next enter bleed channel 52 in plate P1, travel through bleed channel 52, and exit plate P1 from supply bleed outlet port 56 before entering valve controller 20. During this process, supply bleed stream SB exchanges heat with cooling stream C passing through adjacent cooling channels as described below.

Also, bypass bleed stream BB can flow into bypass bleed stream inlet 58 from valve controller 20 and then into bypass bleed port 64. Bypass bleed stream BB continues through plates P1-P3 while in bypass bleed port 64 before reaching bypass bleed stream exit 60 in plate P4 where bypass bleed stream BB can enter actuator 24. Bypass bleed stream BB does not have dedicated cooling or heating channels, and therefore receives minimal cooling or heating while passing through heat exchanger 22. Bypass bleed stream BB can also flow in the opposite direction through heat exchanger 22, traveling from actuator 24 to valve controller 20. Because bypass bleed stream can move in both directions, bypass bleed stream BB is not subjected to heat exchange processes to reduce pressure drop of bleed stream BB. However, in other embodiments, bypass bleed stream may also be routed through heat exchanger 22 so that bypass bleed stream BB exchanges heat with supply cooling stream SC.

Figure 5A:
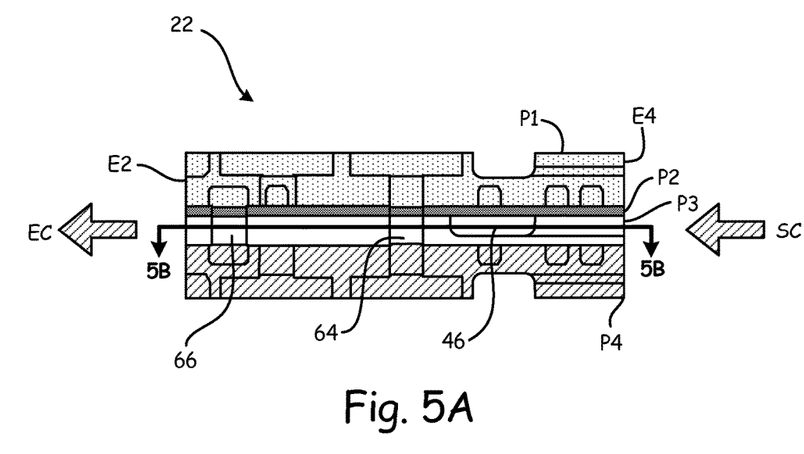
FIG. 5A is a cross-sectional elevation view of the heat exchanger of FIG. 1 along section 5A-5A of FIG. 5B.
Figure 5B:
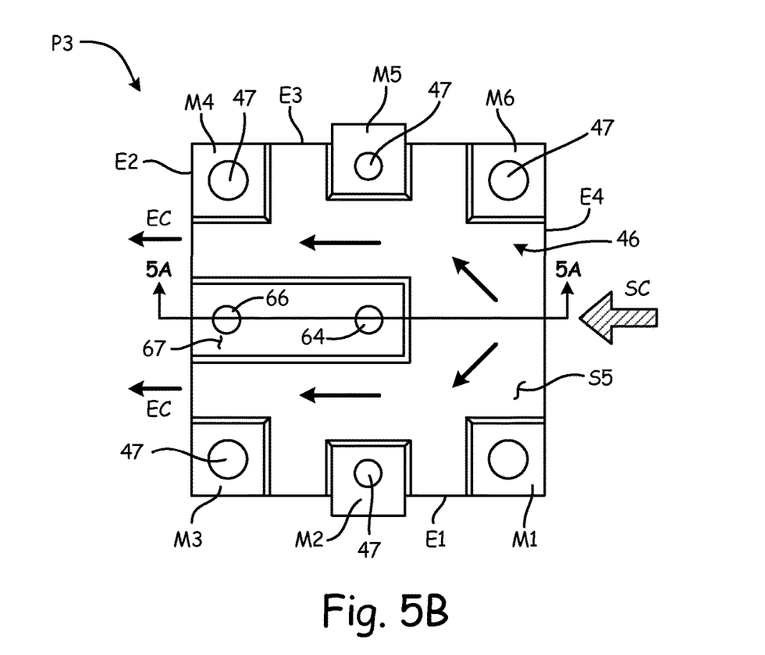
FIG. 5B is a view of the heat exchanger of FIG. 1 along section 5B-5B of FIG. 5A

FIG. 5A is a cross-sectional elevation view of heat exchanger 22 along section 5A-5A of FIG. 5B. FIG. 5B is a plan view of section 5B-5B of heat exchanger 22. FIG. 5A includes plates P1-P4, cooling channel 46, bypass bleed port 64, and bleed channel connector 66. Also shown in FIG. 5A are sides E2 and E4, supply cooling stream SC and exhaust cooling stream EC.FF FIG. 5B includes plate P3, mounts M1-M6, cooling channel 46, bypass bleed port 64, bleed channel connector 66, and raised surface 69. Also shown in FIG. 5B are ends E1-E4, surface S5, supply cooling stream SC and exhaust cooling stream EC.

The connection and functionality of FIGS. 5A and 5B are discussed concurrently. Plates P1-P4 are mounted to each other as explained in FIGS. 2, 3A, and 3B creating cooling channels and bleed channels.

Bypass bleed port 64 and bleed channel connector 66 are connected as described in FIGS. 4A and 4B. Cooling channel 46 is on surface S5 of plate P3. Cooling channel 46 is created by the raised surfaces of mounts M1-M6, and raised surface 69, which surrounds bypass bleed port 64 and bleed channel connector 66 as they pass through plate P3, bypassing plate P3 and cooling channel 46, on their way through plate P2 to plate P1. Raised surface 69 of bypass bleed port 64 and bleed channel connector 66 is rectangular when viewed from the plan view of FIG. 5B, and extends from end E2 towards end E4. Cooling channel 46 is sealed by surface S4 of plate P2.

In one embodiment, supply cooling stream SC enters cooling path 46 of plate P3 from end E4. Supply cooling stream SC contacts the surface of plate P3, allowing for heat transfer to occur between plate P3 and supply cooling stream SC. Plate P3 is also in contact with bleed channel 52 of plate P4 (as shown in FIGS. 4A and 4B). Therefore, supply bleed stream SB and supply cooling stream SC are in an indirect heat exchange relationship through plate P3. Plate P3 will indirectly transfer heat (most often) from supply bleed stream SB to supply cooling stream SC, lowering the temperature of supply bleed stream SB, and raising the temperature of supply cooling stream SC.

Supply cooling stream SC may also transfer heat to supply bleed stream B while it is traveling through bleed channel 50 of plate 1. Bleed channel 50 of plate P1 is sealed by plate P2 (as shown in FIGS. 3A and 3B), allowing supply bleed stream SB to transfer heat to plate P2. Plate P2 also helps to create cooling channel 46 by mating to plate P3 (as shown in FIGS. 3A and 3B). This places plate P2 in an indirect heat exchange relationship between supply cooling stream SC as it travels through cooling channel 46 and supply bleed stream SB as it travels through bleed channel 50. Plate P2 will indirectly transfer heat (most often) from supply bleed stream SB to supply cooling stream SC, lowering the temperature of supply bleed stream SB, and raising the temperature of supply cooling stream SC. Further, plates P2 and P3 are connected to each other, allowing for them to transfer heat between each other, causing additional heat transfer between supply cooling stream SC and supply bleed stream SB. This is also true of every mated plate set in heat exchanger 22.

Supply cooling stream SC may exit plate P3 between the raised surfaces created by mounts M1-M6 and between mounts M1-M6 and raised surface 69 on end E2, as shown in FIG. 5B. In some embodiments, exhaust cooling stream EC may exit cooling channel 46 at only one end, such as end E2, depending on desired cooling performance and routing of ducting or piping that delivers and receives exhaust cooling stream EC from heat exchanger 22.

Plates P1-P4 are shown as being rectangular cuboids having protuberances on several surfaces, but can be can be any shape capable of being assembled, capable of being mounted to valve controller 20 and actuator 24, and capable of transferring heat between two fluid.

Heat exchanger 22 is shown as having four plates; however, heat exchanger 22 may consist of more plates or less plates. For example, plate P2 could be incorporated into plate P1, enclosing bleed channel 50. Similarly, though heat exchanger is shown as having three cooling channels and two bleed channels, heat exchanger may have as few as one bleed channel and one cooling channel, and may as many bleed channels and cooling channels as is possible.

Though a specific routing of bleed channels 50 and 52 are shown, any routing configuration allowing for heat transfer is acceptable. Similarly, though cooling channels 44, 46, and 48 are shown as being single pass, they may be multi-pass channels.

Figure 6:
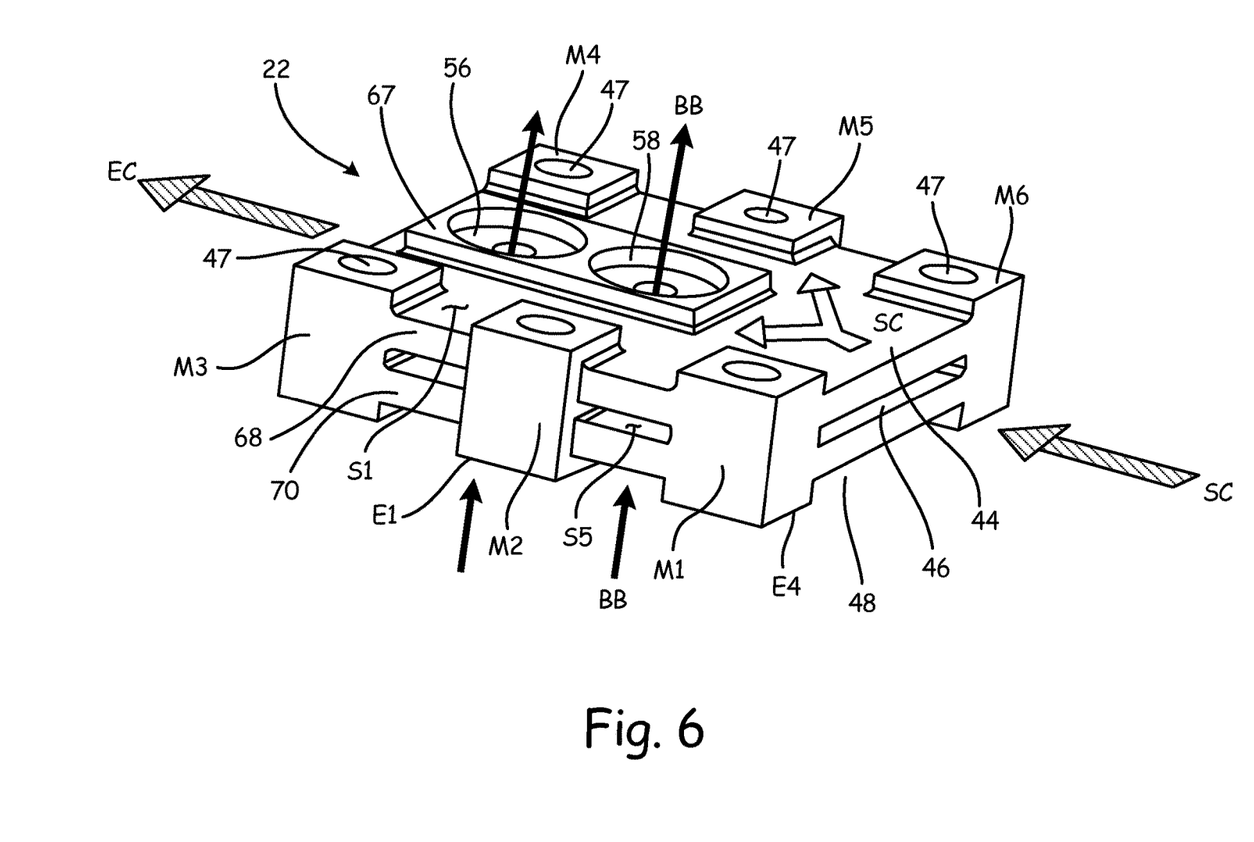
FIG. 6 is an isometric view of another embodiment of the heat exchanger.

FIG. 6 is an isometric view of heat exchanger 22a, which includes mounts M1-M6, cooling channels 44, 46, and 48, holes 47, supply bleed stream outlet 56, bypass bleed stream inlet 58, raised surface 67, first bleed channel enclosure 68, and second bleed channel enclosure 70. Also shown in FIG. 6 are surfaces S1 and S5, ends E1 and E4, supply cooling stream SC, exhaust cooling stream EC, bypass bleed stream BB, and supply bleed stream SB. Elements of FIG. 6 that are similar to elements of FIG. 2 are identified by similar character reference numbers.

First and second bleed channel enclosures 68 and 70 contain bleed channels for routing bleed stream B through heat exchanger 22a. Bleed channel enclosures 68 and 70 are physically separated from each other, held in place by mounts M1-M6, which are disposed around the perimeter of bleed channel enclosures 68 and 70. Holes 47 pass through mounts M1-M6. On top of bleed enclosure 65 is cooling channel 44 at surface S1, which is sealed by valve controller 20 (of FIG. 1). Cooling channel 46 is between bleed channel enclosures 68 and 70, and cooling channel 48 is on the bottom of bleed channel enclosures 70, which is sealed by mounting surface 32 (of FIG. 1). Raised surface 67 surrounds bypass bleed port 64 and bleed channel connector 66 on end E2, extending away from surface S1, towards valve controller 20.

Heat exchanger 22a is mounted to valve controller 20 through mounts M1-M6 at the end of heat exchanger 22a near surface S1. Heat exchanger 22a is also mounted to mounting surface 32, but at the opposite end of heat exchanger 22a. Fasteners pass through mounts M1-M6 fastening valve controller 20 to heat exchanger 22a to mounting surface 32 of actuator 24. Other fastening methods may be used in other embodiments.

Heat exchanger 22a is similar to heat exchanger 22; however, heat exchanger 22a is a single piece. Heat exchanger 22a may be created through layer-by-layer additive manufacturing (sometimes referred to as 3D printing), or heat exchanger 22a may be assembled from multiple pieces and welded or oven-brazed together to create a single piece heat exchanger. Heat exchanger 22a can be composed of any material capable of transferring heat and suitable for its application, such as steel, steel alloys, or nickel-based superalloys, such as inconel.

Heat exchanger 22a functions similarly to heat exchanger 22 and similar reference numbers are used to designate similar elements or features. In one embodiment of heat exchanger 22a, supply cooling stream SC enters cooling channels 44, 46, and 48 at end E4. Supply cooling stream SC may exit cooling channels 44, 46, and 48 through the gaps between mounts M1-M6 or between mounts M1-M6 and raised surface 67. In some embodiments, exhaust cooling stream EC may exit cooling channel 46 at only one end, such as E2, depending on desired cooling performance and routing of ducting or piping that delivers and receives cooling stream SC to and from heat exchanger 22a.

Supply bleed stream SB enters second bleed stream enclosure 70 at bleed stream inlet 54 (shown in previous FIGS.), is routed through second bleed stream enclosure 70, and travels to first bleed stream enclosure 68. Supply bleed stream SB then exits heat exchanger 22a at supply bleed stream outlet 56 and travels into bleed controller 20 (of FIG. 1). Bypass bleed stream BB exits bleed controller 20 and enters bypass bleed stream inlet 58, passes through heat exchanger 22a in a short bypass path and exits into actuator 24. Bypass bleed stream BB may also travel the other direction, from actuator 24, through heat exchanger 22a and into bleed controller 20.

As supply cooling stream SC passes through cooling channels 44, 46, and 48, it contacts the surface bleed channel enclosures 68 and 70, allowing for heat transfer to occur between bleed channel enclosures 68 and 70 and supply cooling stream SC. Bleed channel enclosures 68 and 70 are also in contact with bleed stream B, which flows within bleed channel enclosures 68 and 70. Therefore, supply bleed stream SB and supply cooling stream SC are in an indirect heat exchange relationship through bleed channel enclosures 68 and 70. Bleed channel enclosures 68 and 70 will indirectly transfer heat (most often) from supply bleed stream SB to supply cooling stream SC, lowering the temperature of supply bleed stream SB, and raising the temperature of supply cooling stream SC. Because the bypass bleed stream travels through a (relatively) short path through heat exchanger 22a, bypass bleed stream takes part in little heat transfer before exiting heat exchanger 22a and entering actuator 24.

Heat exchanger 22a, as a single piece heat exchanger, has many benefits. First, heat exchanger 22a may be less expensive to manufacture, because little labor is involved. Also, installation and replacement may be simpler and faster than a multiple piece heat exchanger, because there is only a single piece to install or replace. Also, because heat exchanger 22a is made from a single piece, it is less likely (in many cases) to develop a leak and less likely to fail.

Valve system 12, though simply described as a pneumatic valve for controlling the flow of bleed air in an environmental control system, can be a servo, or any other control valve within an aircraft system. Valve system 12 can also be a control valve in any other system or process, for example a valve for controlling a hot process fluid.

A control valve system includes a valve controller, such as a torque motor, to control the flow of pressurized air for controlling an actuating assembly within a valve, and a heat exchanger located in between the valve and the valve controller. The heat exchanger cools the bleed air before it enters the valve controller, which substantially increases the life of the torque motor.

Discussion of Possible Embodiments

The following are non-exclusive descriptions of possible embodiments of the present invention.

A valve system includes a valve, a valve controller, and a heat exchanger. The valve is configured to open and close a control device in response to a working fluid. The controller controls the flow of the working fluid to and from the valve. The heat exchanger is mounted between the valve and the valve controller. The heat exchanger receives the working fluid from the valve, cools the working fluid using a cooling stream, and delivers cooled working fluid to the valve controller.

The system of the preceding paragraph can optionally include, additionally and/or alternatively, any one or more of the following features, configurations and/or additional components.

The heat exchanger can include multiple working inlets for receiving the working fluid, and multiple cooling inlets for receiving the cooling stream.

The heat exchanger can include at least one plate.

The heat exchanger can include a first plate having a first surface having a first channel configured to receive a cooling stream, and having a second surface having a second channel for receiving a working stream. The heat exchanger can also include a second plate having a first and second surface. The first surface can mate to the second surface of the first plate. The heat exchanger can also include a third plate having a first surface mating to the second surface of the second plate. The first surface of the third plate can have a first channel receives a cooling stream. The third plate can have a second surface. The heat exchanger can further include a fourth plate having a first surface having a first channel configured to receive a working stream. The fourth plate can have a second surface having a second channel configured to receive a cooling stream. The first surface can mate to the second surface of the third plate.

The plates can be brazed together.

The heat exchanger can be formed as a single piece.

The heat exchanger can include a first surface mounted to the valve controller, and a second surface mounted to the valve. The heat exchanger can also include a first channel for receiving the cooling stream. The heat exchanger can further include a second channel adjacent to the first channel, and configured to receive the working fluid. The heat exchanger can also include a third channel for receiving the cooling stream. The third channel can be adjacent to the second channel. The heat exchanger can further include a fourth channel for receiving the working fluid. The fourth channel can be adjacent to the third channel. The heat exchanger can further include a fifth channel for receiving the cooling stream. The fifth channel can be adjacent to the fourth channel.

The second channel can be configured to deliver the working stream to the fourth channel.

The heat exchanger can include a first surface configured to mount to the valve controller and a second surface configured to mount to the valve. The heat exchanger can also include a plurality of cooling channels configured to receive the cooling stream, and a plurality of working channels configured to receive the working fluid. The working channels can be adjacent to one or more cooling channels.

The working channels can be configured to create a single working fluid flow path between the valve and the valve controller.

A gas turbine engine system can include the valve system of claim 1. The gas turbine engine system can include a gas turbine engine for delivering the working fluid and the cooling stream to the valve system. The valve can be a servo valve, and the valve controller can be a torque motor.

The working fluid can be bleed air from the gas turbine engine and the cooling fluid can be fan air from the gas turbine engine.

The heat exchanger can include a bypass passage connecting the valve to the valve controller.

Another embodiment includes a method. The method includes receiving a working fluid in a first passage of a heat exchanger that is mounted between a valve and a valve controller. The heat exchanger directs the working fluid through a first conductive path. A cooling fluid is received in a second passage of the heat exchanger and directed through a second conductive path. The working fluid is cooled through indirect heat transfer using the cooling fluid and is delivered to the valve controller from the heat exchanger. The cooling fluid is exhausted from the heat exchanger. The working fluid is delivered from the valve controller to a bypass path of the heat exchanger, and is supplied from the heat exchanger to a chamber of the valve.

The method of the preceding paragraph can optionally include, additionally and/or alternatively, any one or more of the following features, configurations and/or additional components or steps.

The working fluid can be delivered from the chamber to the bypass path.

The working fluid can be sent from the bypass path to the valve controller.

The working fluid can exhaust through the valve controller.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. A valve system comprising:
  a valve configured to open and close a control device in response to a working fluid;
  a valve controller for controlling the flow of the working fluid to and from the valve; and
  a heat exchanger mounted between the valve and the valve controller, wherein the heat exchanger receives the working fluid from the valve, cools the working fluid using a cooling stream, and delivers cooled working fluid to the valve controller, and wherein the heat exchanger has a bypass passage connecting the valve to the valve controller.

2. The valve system of claim 1 wherein the heat exchanger further comprises multiple working inlets for receiving the working fluid, and multiple cooling inlets for receiving the cooling stream.

3. The valve system of claim 1, wherein the heat exchanger is comprised of at least one plate.

4. The valve system of claim 3, wherein the heat exchanger comprises:
  a first plate having a first surface having a first channel configured to receive the cooling stream, and having a second surface having a second channel for receiving the working fluid;
  a second plate having a first and second surface, wherein the first surface of the second plate mates to the second surface of the first plate;
  a third plate having a first surface mating to the second surface of the second plate, wherein the first surface of the third plate has a first channel configured to receive the cooling stream, and wherein the third plate has a second surface; and
  a fourth plate having a first surface having a first channel configured to receive the working fluid, and having a second surface having a second channel configured to receive the cooling stream, wherein the first surface of the fourth plate mates to the second surface of the third plate.

5. The valve system of claim 4, wherein the plates are brazed together.

6. The valve system of claim 1, wherein the heat exchanger is formed as a single piece.

7. The valve system of claim 6, wherein the heat exchanger comprises:
  a first surface mounted to the valve controller;
  a second surface mounted to the valve;
  a first channel for receiving the cooling stream;
  a second channel adjacent to the first channel, and configured to receive the working fluid;
  a third channel for receiving the cooling stream, wherein the third channel is adjacent to the second channel;
  a fourth channel for receiving the working fluid, wherein the fourth channel is adjacent to the third channel;
  a fifth channel for receiving the cooling stream, wherein the fifth channel is adjacent to the fourth channel.

8. The valve system of claim 7, wherein the second channel is configured to deliver the working fluid to the fourth channel.

9. The system of claim 1, wherein the heat exchanger comprises:
  a first surface configured to mount to the valve controller;
  a second surface configured to mount to the valve;
  a plurality of cooling channels configured to receive the cooling stream; and
  a plurality of working channels configured to receive the working fluid, wherein each working channel is adjacent to one or more cooling channels.

10. The valve system of claim 9, wherein the working channels are configured to create a single working fluid flow path between the valve and the valve controller.

11. A gas turbine engine system including the valve system of claim 1, wherein the gas turbine engine system further comprises a gas turbine engine for delivering the working fluid and the cooling stream to the valve system, wherein the valve is a servo valve, and wherein the valve controller is a torque motor.

12. The gas turbine engine system of claim 11, wherein the working fluid is bleed air from the gas turbine engine and the cooling fluid is fan air from the gas turbine engine.

* * * * *